United States Patent [19]

Young

[11] Patent Number: 4,646,393

[45] Date of Patent: Mar. 3, 1987

[54] CLAMPING BAND FOR ELECTROMAGNETIC SHIELDING BAND CABLE CONNECTOR

[75] Inventor: Thomas F. Young, Simi Valley, Calif.

[73] Assignee: Electro Adapter, Inc., Chatsworth, Calif.

[21] Appl. No.: 759,585

[22] Filed: Jul. 25, 1985

[51] Int. Cl.$^4$ ............................................. B65D 63/02
[52] U.S. Cl. ................. 24/20 R; 24/20 TT; 24/20 W; 24/23 W
[58] Field of Search ............ 24/20 R, 20 CW, 20 EE, 24/20 TT, 20 W, 23 B, 23 W, 23 EE, 25, 17 R

[56] References Cited

U.S. PATENT DOCUMENTS

| | | | |
|---|---|---|---|
| 157,032 | 11/1874 | Smith | 24/20 EE |
| 356,083 | 1/1887 | Schrader et al. | 24/20 EE |
| 570,276 | 10/1896 | Bull . | |
| 916,673 | 3/1909 | Clawson | 24/20 R |
| 1,084,407 | 1/1914 | Deist . | |
| 1,176,181 | 3/1916 | Thomas | 24/20 TT |
| 2,163,048 | 6/1939 | McKee | 24/23 W |
| 2,188,710 | 1/1940 | Giovanini et al. | 24/23 W |
| 2,192,979 | 3/1940 | McAneny, Jr. | 24/23 B |
| 2,881,915 | 4/1959 | Koehler et al. | 24/23 W |
| 2,935,773 | 5/1957 | Weckesser . | |
| 3,102,311 | 9/1963 | Martin et al. . | |
| 3,152,219 | 10/1964 | Murray et al. . | |
| 3,174,777 | 3/1965 | Lodholm et al. | 24/20 W |
| 3,452,318 | 6/1969 | Tanges, Jr. . | |
| 3,660,869 | 5/1972 | Caveney et al. . | |
| 3,887,895 | 6/1975 | Pierzchala . | |
| 4,222,155 | 9/1980 | Oetiker . | |
| 4,272,870 | 6/1981 | McCormick . | |
| 4,402,113 | 9/1983 | Smith . | |
| 4,541,146 | 9/1985 | Giannone | 24/20 R |
| 4,543,691 | 10/1985 | Calmettes | 24/20 R |

FOREIGN PATENT DOCUMENTS

| | | | |
|---|---|---|---|
| 11627 | of 1908 | United Kingdom | 24/23 W |
| 2119321 | 11/1983 | United Kingdom | 24/23 B |

OTHER PUBLICATIONS

Electro Adaptor, Inc. drawing 214L0001, one sheet, Jul. 22, 1983.
Punch-Lock Company brochure, one sheet, copyright 1963.
Panduit Brochure (4 pages), no date given.

*Primary Examiner*—Victor N. Sakran
*Attorney, Agent, or Firm*—Harris, Kern, Wallen & Tinsley

[57] ABSTRACT

A clamping band for affixing an electromagnetic shielding sleeve to an electrical cable or the like, which band may be positioned around the connector and tightened by a pulling force, and which band can be removed and replaced. The band comprises a single strip of metal with a strap section and a buckle section, with the buckle section having an opening for receiving the strap section to form a circle for positioning about the shield and connector. The band is tightened by pulling to the desired size, after which it is folded over to lock the band in place and cut to an appropriate length.

3 Claims, 7 Drawing Figures

U.S. Patent  Mar. 3, 1987  4,646,393
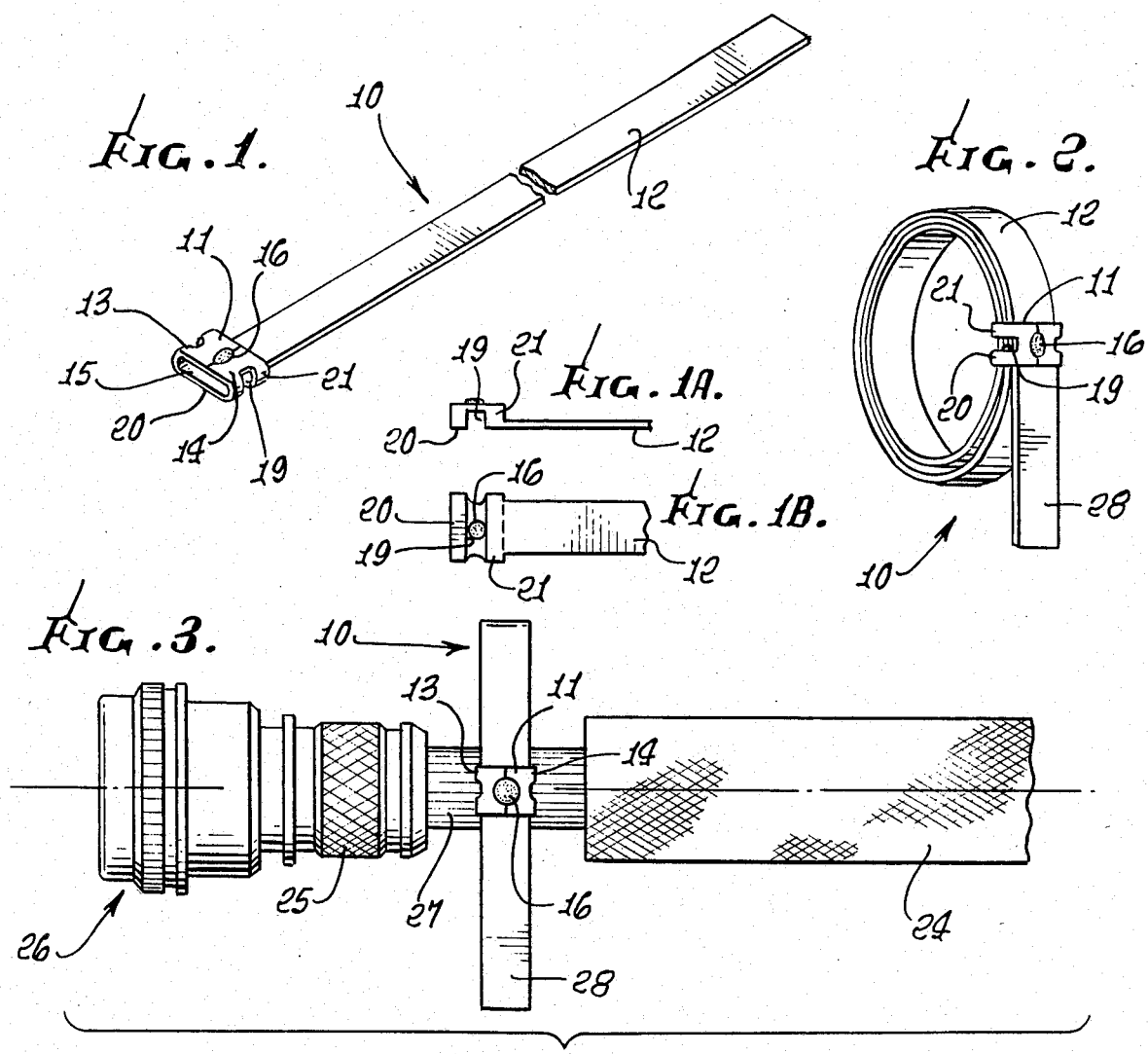
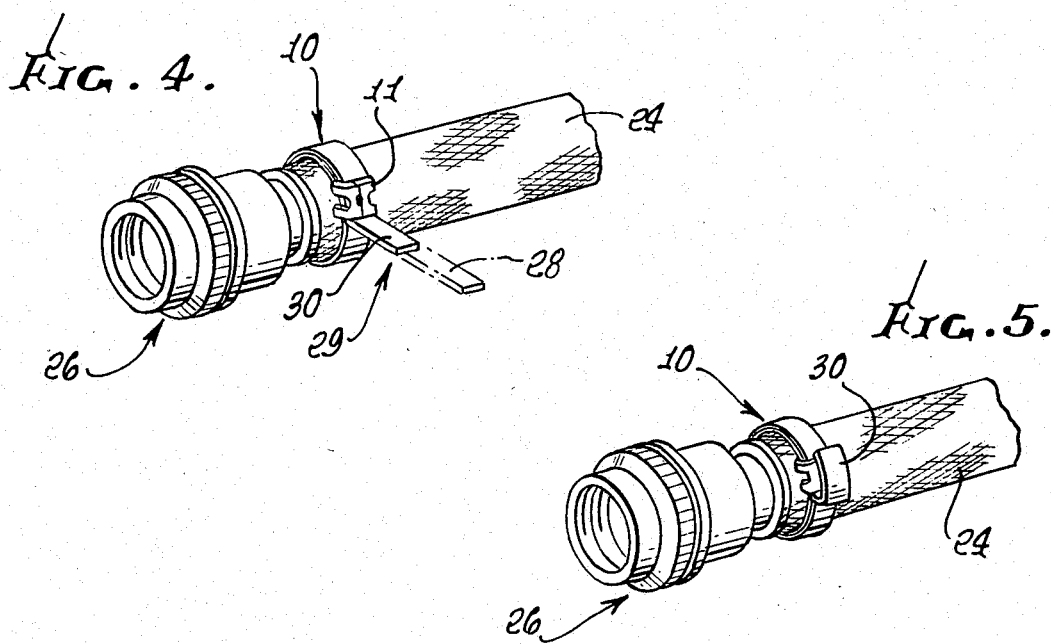

4,646,393

CLAMPING BAND FOR ELECTROMAGNETIC SHIELDING BAND CABLE CONNECTOR

BACKGROUND OF THE INVENTION

This invention relates to a clamping band for affixing an electromagnetic shielding sleeve to an electrical cable connector or the like.

Electrical cables comprising a plurality of electrical conductors often are encased in a woven metal braid for the purpose of shielding the conductors from electromagnetic and radio frequency interference. The individual conductors are terminated at an electrical connector, and it is required that a mechanically secure and electrical low resistance connection be made between the woven shielding braid and the connector. This has been accomplished in the past by various arrangements, and various problems have been encountered. One problem is the bulk and awkwardness of the tool utilized for securing the clamp, thereby limiting the locations at which the tool can be used. By way of example, many electrical cables are utilized in aircraft with very limited space and very limited access, and therefore it is highly desirable to have a clamping band which can be installed without requiring operation of a bulky tool.

Another desirable feature is the ability to remove and replace the clamping band during maintenance operations and/or when conductors in a cable are being changed or redirected. This requires a type of clamping band which can be removed in the field without damage to the cable, and which can be installed in the field, often when only limited resources in the form of tools and power are available.

By way of example, some types of tools require some form of power such as electric, air or hydraulic, and it is an object of the present invention to provide a clamping band which can be affixed with a hand operated tool. Another type of conventional clamping band comprises a unity ring which is positioned around the braid and connector and electromagnetically formed to compress the band onto the sleeve. While this provides a very satisfactory mechanical and electrical connection, it requires insertion of the cable into the electromagnetic forming equipment which ordinarily is only possible in a factory situation.

Other problems with conventional band termination of shield braid reside the fact that some require a slight reverse motion in order to lock the band in the buckle, with a resultant loosening in the clamping and poor electrical contact. Another band design provides for locking the buckle with a direct forming blow, as by a hammer, resulting in damage to the connecting device or the inner tube. Bands of these types have primarily been used for fastening rubber hoses onto tubes or fittings or for holding packages together, which permits the clamping band to be compressed and slightly relaxed for tightening and which will withstand punch or hammer type impact. In contrast, the electromagnetic type of shield braid must be held tightly in place without use of any elastomeric components which could flow and loosen during use. Since the electrical connectors typically are thin walled aluminum alloy, impact type connections are not satisfactory.

Accordingly, it is an object of the present invention to provide a new and improved clamping band for clamping braid shield sleeves onto electrical connectors to provide electromagnetic and radio frequency interference shielding. A further object is to provide such a band which can be positioned around the assembly and which does not require sliding axially over the assembly, and a band which can be tightened by pulling and locked in place by folding over, without requiring any impact fastening or elastomeric fastening.

It is an object of the invention to provide such a clamping band that is tightened by pulling which can be accomplished by simple hand operated tools in locations of limited access. A particular object is to provide such a clamping band which is flexible throughout its length, including the buckle section, so as to make a substantially 360° continuous contact between the band and the shielding sleeve.

A further object is to provide a new and improved buckle configuration with the buckle wings firmly joined together and with the inner of the loops formed by the wings contiguous with the strap and with the outer of the loops of constant width.

Other objects, advantages, features and results will more fully appear in the course of the following description.

SUMMARY OF THE INVENTION

A clamping band for affixing an electromagnetic shielding sleeve to an electrical cable connector or the like, which band may be positioned around the sleeve-connector assembly by wrapping around the assembly and which band is fixed in place by pulling on the free end of the band and folding the free end back over the buckle section. A band comprising a single strip of metal with a strap section and a buckle section, with the buckle section having an opening for receiving the strap section to form a circle of the strap section about the sleeve-connector assembly. The buckle has opposed wings with an opening therein of a length at least as great as the width of the strap section, with the wings folded toward each other in abutting relation to form the opening for receiving the strap section, with the abutting wings fixed to each other, preferably by welding. When the wings are folded and fixed together, transverse parallel segments form a first loop of uniform width and a second loop spaced from the first loop and contiguous with the strap section of the band.

BRIEF DESCRIPTION OF THE DRAWINGS

FIG. 1 is a perspective view of a clamping band incorporating the presently preferred embodiment of the invention;

FIG. 1A is a partial side view of the band of FIG. 1;

FIG. 1B is a partial bottom view of the band of FIG. 1;

FIG. 2 is a perspective view showing the band of FIG. 1 formed into a two ring circle;

FIG. 3 is an exploded view showing the band of FIG. 2 in combination with a cable connector and a shielding sleeve;

FIG. 4 is a perspective view of the combination of FIG. 3 assembled with the band tightened, bent outward to lock, and cut off; and FIG. 5 is a view similar to that of FIG. 4 showing the band folded over and locked in place.

DESCRIPTION OF THE PREFERRED EMBODIMENT

Referring to FIGS. 1, 1A and 1B, the band 10 is a metal strap, typically of stainless steel, having a buckle section 11 and a strap section 12 formed from a single strip of metal. The buckle section has opposed wings 13, 14 with the wings folded toward each other in abutting relation to form an opening 15. The abutting wings are fixed to each other, preferably by welding as shown at 16.

An opening 19 is formed in the buckle section, typically by punching, to provide a loop 20 of uniform width at the end of the buckle and another loop 21 which is contiguous with the strap section 12. The opening 19 is of a length at least as great as the width of the strap section, so that the two loops 20, 21 are joined by the flat portions of the abutting wings 13, 14, as seen in FIG. 1B and FIG. 2, so that this flat portion may serve as a hinge between the two loops, as seen in FIG. 1A, so that the buckle may flex into an arcuate configuration. The two loops form transverse parallel segments on opposite sides of the opening 19, with one segment contiguous with the strap section and with the other section spaced from the strap section from the other opening 19, with this other segment being of constant width.

The band 10 is used for clamping an electromagnetic shielding sleeve such as a woven metal braid sleeve 24 onto a tubular portion 25 of an electrical cable connector 26. As shown in FIG. 3, the sleeve 24 is positioned about a bundle of conductors 27 which are terminated in the connector 26.

The band may be coiled with the free end 28 passed through the opening 15 of the buckle one or more times to provide the coiled band as shown in FIG. 2. The sleeve 24 is placed in position on the portion 25 of the connector 26, and the coiled band may be slide into position over the connector 26. Alternatively where conditions do not permit axial sliding of the coiled band over the connector, the band may be coiled in place over the sleeve and moved axially along the sleeve to the clamping position.

A pulling force is applied at the free end 28 of the band to tighten the band about the sleeve and connector. Preferably this is accomplished using a hand held and hand actuated tool which grips the free end and abuts the sleeve, with actuation of the tool providing the pulling force. One such tool is provided by Panduit Corp. for use with its cable bundling straps. Another tool especially suited for this purpose is offered by Electro Adaptor, Inc., the assignee of this application. These pulling tools are adjustable so that the pulling operation is terminated when a preset tension is reached. This condition is shown in FIG. 4, with the clamping band pulled tight around the sleeve.

After the pulling step is finished, the band is bent outward about 90° to lock it in place. Then the excess portion of the strap section is cut off, as indicated at 29, leaving a short end 30. The short end 30 may then be bent through another 90°, as shown in FIG. 5, thereby completing the clamping operation.

Thus, it is seen that the clamping function is achieved without utilizing any elastomers in the assembly, without requiring any reverse motion of the clamping band to achieve locking, and without requiring any impact locking.

A typical clamping band is formed of 0.019 inches thick stainless steel, with the strap section 0.375 inches wide. With a buckle that is 0.375 inches long, the band can be pulled down tight to a diameter as small as 0.250 inches. At the same time, the band makes a substantially 360° continuous contact with the braid sleeve under the band. Another band in use is 0.250 inches wide, with a buckle 0.250 inches long, also formed of 0.019 inches thick stainless steel. This band can be pulled down to a diameter as small as 0.156 inches. Of course, there is no limit on the maximum diameter of the sleeve and connector on which the clamping bands can be used. One feature of the invention which permits this wide range of use is the provision of the opening 19 between the loops 20, 21 with the outer loop 20 being of constant width. This configuration permits the loops to bend in an arcuate manner with respect to each other, and permits the strap section of the band to bend around the outer loop so that there is a minimum amount of the sleeve not in direct contact with the band.

During the tightening operation, substantial pulling forces may be applied to the band, which forces tend to cause the buckle to separate. With the design of the present invention, with the wings abutting and affixed to each other, the buckle will withstand extremely high pulling forces. A band of the dimensions described above readily withstands 300 pounds direct pull at the strap end without damage to the buckle. At the same time, the flexible buckle design permits completion of the clamping function to achieve continuous contact with the shield with pulling forces of less than 50 pounds.

I claim:

1. A clamping band for affixing an electromagnetic shielding sleeve to an electrical cable connector,
   said band comprising a single strip of metal having a strap section and an integral buckle section, with said strap section terminating at said buckle section,
   said buckle section having a first opening for receiving said strap section for forming a circle of said strap section for positioning about a flexible shielding sleeve and a tubular connector for clamping the sleeve to the connector,
   said buckle having only a single set of opposed wings, with a second transverse slot-like opening therein of a length at least as great as the width of said strap section, and
   with said wings folded toward each other in abutting relation to form said first opening, with said abutting wings fixed to each other only at a zone in radial alignment with and superimposed relative to said second transverse slot opening to form a flexible hinge section which enables the buckle to bend to a smaller diameter with said transverse slot opening diminishing in width, and
   with said second transverse slot opening when said wings are folded and fixed together, forming a first loop of uniform width and a second loop adjoining said strap section, with said first and second loops joined together by said hinge section and spaced from each other by said second transverse slot opening to provide said flexible buckle section so that said first loop bends away from said second loop as said clamping band is tightened and maintains circumferential contact with the object being clamped.

2. A clamping band as defined in claim 1 wherein said abutting wings are welded together.

3. A clamping band as defined in claim 2 wherein said abutting wings have transverse parallel segments on opposite sides of said second transverse slot opening with one of said segments contiguous with said strap section and with the other of said segments of constant width.

* * * * *